(12) United States Patent
Miyazaki et al.

(10) Patent No.: US 10,063,744 B2
(45) Date of Patent: Aug. 28, 2018

(54) IMAGE READING DEVICE, IMAGE FORMING APPARATUS, AND SHADING DATA PROCESSING METHOD

(71) Applicants: Susumu Miyazaki, Tokyo (JP); Tomoyuki Yoshida, Kanagawa (JP); Tetsuo Inui, Kanagawa (JP); Shigefumi Imoto, Osaka (JP)

(72) Inventors: Susumu Miyazaki, Tokyo (JP); Tomoyuki Yoshida, Kanagawa (JP); Tetsuo Inui, Kanagawa (JP); Shigefumi Imoto, Osaka (JP)

(73) Assignee: Ricoh Company, Ltd, Tokyo (JP)

( * ) Notice: Subject to any disclaimer, the term of this patent is extended or adjusted under 35 U.S.C. 154(b) by 17 days.

(21) Appl. No.: 15/276,892

(22) Filed: Sep. 27, 2016

(65) Prior Publication Data

US 2017/0111549 A1 Apr. 20, 2017

(30) Foreign Application Priority Data

Oct. 19, 2015 (JP) .................................. 2015-205713

(51) Int. Cl.
*H04N 1/60* (2006.01)
*G03F 3/08* (2006.01)
(Continued)

(52) U.S. Cl.
CPC ............ *H04N 1/4095* (2013.01); *H02N 1/12* (2013.01); *H04N 1/0313* (2013.01); *H04N 1/2034* (2013.01); *H04N 2201/0081* (2013.01)

(58) Field of Classification Search
None
See application file for complete search history.

(56) References Cited

U.S. PATENT DOCUMENTS 5,099,341 A * 3/1992 Nosaki .................. H04N 1/401
358/461
5,253,083 A * 10/1993 Hirota .................... H04N 1/401
358/461
(Continued)

FOREIGN PATENT DOCUMENTS

JP 4-061560 2/1992
JP 2006-072838 3/2006
(Continued)

*Primary Examiner* — Madelein Nguyen
(74) *Attorney, Agent, or Firm* — Harness, Dickey & Pierce, P.L.C.

(57) ABSTRACT

An image reading device includes a first unit to read one surface of a document in a first area facing a document path, a second unit disposed in the first area to read the other surface of the document, a first reference member facing the first unit at a first distance therefrom at a second position in a second area not facing the path, a second reference member facing the first unit at a second distance therefrom at a first position in the first area, a third reference member facing the second unit at the second distance therefrom, and a correction unit to correct, based on a difference between first data generated through reading of the first member by the first unit and second data generated through reading of the second member by the first unit, third data generated through reading of the third member by the second unit.

10 Claims, 6 Drawing Sheets

(51) Int. Cl.
*H04N 1/409* (2006.01)
*H02N 1/12* (2006.01)
*H04N 1/203* (2006.01)
*H04N 1/031* (2006.01)

(56) References Cited

U.S. PATENT DOCUMENTS

| | | | | |
|---|---|---|---|---|
| 5,500,745 | A * | 3/1996 | Iishiba | H04N 1/401 358/461 |
| 5,778,109 | A * | 7/1998 | Morigami | H04N 1/401 348/251 |
| 5,802,217 | A * | 9/1998 | Suzuki | H04N 1/40006 358/461 |
| 6,175,660 | B1 * | 1/2001 | Nabeshima | H04N 1/401 358/451 |
| 6,292,269 | B1 * | 9/2001 | Kawai | H04N 1/4076 358/1.9 |
| 6,421,146 | B1 * | 7/2002 | Yoo | H04N 1/4076 358/461 |
| 7,817,317 | B2 * | 10/2010 | Ito | H04N 1/4076 358/1.9 |
| 8,305,661 | B2 * | 11/2012 | Baba | H04N 1/0402 358/474 |
| 8,670,163 | B2 * | 3/2014 | Takahashi | H04N 1/031 358/474 |
| 8,749,860 | B2 * | 6/2014 | Arima | H04N 1/401 358/1.1 |
| 8,767,268 | B2 * | 7/2014 | Tsukahara | H04N 1/00013 358/461 |
| 9,053,360 | B2 * | 6/2015 | Kawamoto | G06K 9/00442 |
| 2001/0022672 | A1 | 9/2001 | Matsui | H04N 1/401 358/461 |
| 2001/0030770 | A1 * | 10/2001 | Ohashi | H04N 1/4076 358/465 |
| 2002/0054374 | A1 * | 5/2002 | Inoue | H04N 1/4076 358/461 |
| 2005/0200917 | A1 * | 9/2005 | Kanesaka | G03B 27/62 358/486 |
| 2006/0209312 | A1 * | 9/2006 | Shoda | H04N 1/3871 358/1.1 |
| 2006/0232683 | A1 * | 10/2006 | Ichihashi | G06T 5/50 348/222.1 |
| 2006/0274961 | A1 * | 12/2006 | Chiu | G06T 5/002 382/274 |
| 2007/0223061 | A1 * | 9/2007 | Tanaka | H04N 1/203 358/497 |
| 2007/0223062 | A1 * | 9/2007 | Tanaka | H04N 1/03 358/497 |
| 2008/0123163 | A1 * | 5/2008 | Nakano | H04N 1/00681 358/498 |
| 2008/0180514 | A1 * | 7/2008 | Sekizawa | G03G 15/043 347/252 |
| 2008/0198426 | A1 * | 8/2008 | Yokochi | H04N 1/00013 358/486 |
| 2009/0002784 | A1 * | 1/2009 | Morikawa | H04N 1/203 358/520 |
| 2009/0034001 | A1 * | 2/2009 | Shiraishi | H04N 1/00002 358/2.1 |
| 2009/0086279 | A1 * | 4/2009 | Kawai | H04N 1/4076 358/461 |
| 2010/0027081 | A1 * | 2/2010 | Sano | H04N 1/00588 358/498 |
| 2010/0110499 | A1 * | 5/2010 | Baba | H04N 1/0402 358/451 |
| 2010/0189452 | A1 * | 7/2010 | Tanaka | G03G 15/043 399/51 |
| 2011/0109945 | A1 * | 5/2011 | Tsukahara | H04N 1/2032 358/461 |
| 2011/0164290 | A1 * | 7/2011 | Nishikawa | H04N 1/00909 358/461 |
| 2012/0013955 | A1 * | 1/2012 | Ikeda | H04N 1/203 358/461 |
| 2012/0113479 | A1 * | 5/2012 | Sakai | H04N 1/401 358/447 |
| 2012/0162729 | A1 * | 6/2012 | Kurakata | H04N 1/00716 358/518 |
| 2012/0307317 | A1 * | 12/2012 | Uchida | H04N 1/401 358/461 |
| 2013/0003147 | A1 * | 1/2013 | Shimatani | G03G 15/602 358/505 |
| 2013/0044338 | A1 * | 2/2013 | Nikaku | H04N 1/00013 358/1.13 |
| 2013/0070309 | A1 * | 3/2013 | Sakai | H04N 1/401 358/474 |
| 2013/0293934 | A1 * | 11/2013 | Shinto | H04N 1/00575 358/461 |
| 2013/0335788 | A1 * | 12/2013 | Utsunomiya | H04N 1/00801 358/474 |
| 2015/0281517 | A1 * | 10/2015 | Hori | H04N 1/4072 358/474 |
| 2016/0119501 | A1 * | 4/2016 | Kii | H04N 1/401 358/486 |
| 2017/0034387 | A1 * | 2/2017 | Horiguchi | H04N 1/203 |
| 2017/0078527 | A1 * | 3/2017 | Fusayasu | H04N 1/00018 |
| 2017/0126911 | A1 * | 5/2017 | Kogi | H04N 1/0035 |

FOREIGN PATENT DOCUMENTS

| | | |
|---|---|---|
| JP | 2008-219101 | 9/2008 |
| JP | 2009-010830 | 1/2009 |
| JP | 2009-212602 | 9/2009 |
| JP | 2010-219965 | 9/2010 |
| JP | 2012-151743 | 8/2012 |
| JP | 2014-036373 | 2/2014 |
| JP | 2015-154171 | 8/2015 |

* cited by examiner

IMAGE READING DEVICE, IMAGE FORMING APPARATUS, AND SHADING DATA PROCESSING METHOD

CROSS-REFERENCE TO RELATED APPLICATION

This patent application is based on and claims priority pursuant to 35 U.S.C. § 119(a) to Japanese Patent Application No. 2015-205713 filed on Oct. 19, 2015, in the Japan Patent Office, the entire disclosure of which is hereby incorporated by reference herein.

BACKGROUND

Technical Field

This disclosure relates to an image reading device, an image forming apparatus, and a shading data processing method.

Related Art

A typical image reading device with a fixed image reading unit, as represented by a sheet-through image reading device, reads the density of a reference white plate or roller disposed on a surface facing a contact image sensor (CIS) module serving as an image reading unit, to thereby generate shading data.

SUMMARY

In one embodiment of this disclosure, there is provided an improved image reading device that includes, for example, a first image reading unit, a second image reading unit, a first shading reference member, a second shading reference member, a third shading reference member, and a correction unit. The first image reading unit is movable between a first area facing a document transport path and a second area not facing the document transport path, and is capable of reading, in the first area, a first surface of a document transported on the document transport path. The second image reading unit is disposed in the first area, and is capable of reading a second surface of the document. The first shading reference member faces the first image reading unit at a first distance therefrom when the first image reading unit is located at a second position in the second area. The second shading reference member faces the first image reading unit at a second distance therefrom across the document transport path when the first image reading unit is located at a first position in the first area. The third shading reference member faces the second image reading unit at the second distance therefrom across the document transport path. The correction unit corrects third shading data based on a difference between first shading data and second shading data. The first shading data is generated through reading of the first shading reference member by the first image reading unit. The second shading data is generated through reading of the second shading reference member by the first image reading unit. The third shading data is generated through reading of the third shading reference member by the second image reading unit.

In one embodiment of this disclosure, there is provided an improved image forming apparatus including the above-described image reading device.

In one embodiment of this disclosure, there is provided a shading data processing method performed by an image reading device including a first image reading unit and a second image reading unit. The first image reading unit is movable between a first area facing a document transport path and a second area not facing the document transport path, and is capable of reading, in the first area, a first surface of a document transported on the document transport path. The second image reading unit is disposed in the first area, and is capable of reading a second surface of the document. The shading data processing method includes acquiring first shading data through reading, with the first image reading unit and at a second position in the second area, a first shading reference member facing the first image reading unit as at a first distance therefrom, acquiring second shading data through reading, with the first image reading unit and at a first position in the first area, a second shading reference member facing the first image reading unit at a second distance therefrom across the document transport path, acquiring third shading data through reading, with the second image reading unit, a third shading reference member facing the second image reading unit at the second distance therefrom across the document transport path, and correcting the third shading data based on a difference between the first shading data and the second shading data.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
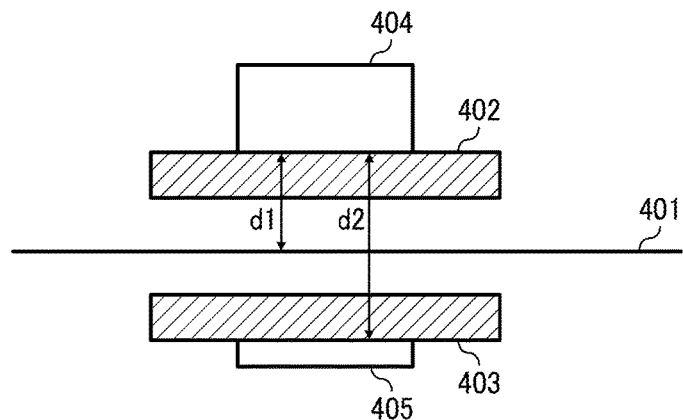
FIG. 1 is a diagram illustrating a schematic configuration of an image reading unit of an existing image reading device.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same function, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring now to the drawings, wherein like reference numerals designate identical or corresponding parts throughout the several views, embodiments of this disclosure will be described in detail.

In a typical image reading device with a fixed image reading unit, a document transported therethrough contacts a surface of a reference white plate or roller, thereby smearing the surface of the reference white plate or roller with time. According to a shading data generation technique using such an image reading device, therefore, the reference density varies depending on the reading position in the reference white plate or roller, compromising the maintenance of density uniformity necessary for generating the shading data.

The above-described issue may be addressed by an image reading device with an image reading unit illustrated in FIG. 1, which includes reading glasses 402 and 403 disposed facing each other across a document transport path 401, a sensor module 404 disposed on an upper surface of the upper reading glass 402, and a shading reference plate 405 disposed on a lower surface of the lower reading glass 403.

That is, the image reading unit is configured to have the shading reference plate 405 disposed under the reading glass 403 opposite to the sensor module 404 across the document transport path 401 to prevent the document from contacting the shading reference plate 405.

In this configuration, however, there arises a difference between a distance d1 from the sensor module 404 to the document transport path 401 (nearly equal to the distance from the sensor module 404 to the document) and a distance d2 from the sensor module 404 to the shading reference plate 405, thereby causing an error between shading data of a surface of the document and shading data of a surface of the shading reference plate 405.

The image reading device therefore corrects the error of the shading data in the following manner. A reference sheet is first transported and read by the sensor module 404 to generate first correction data, and then the shading reference plate 405 is read by the sensor module 404 to generate second correction data. The ratio of the first correction data to the second correction data is then calculated to create correction factor data, and the second correction data is multiplied by the correction factor data to obtain correct shading data to be used in document reading.

Figure 2:
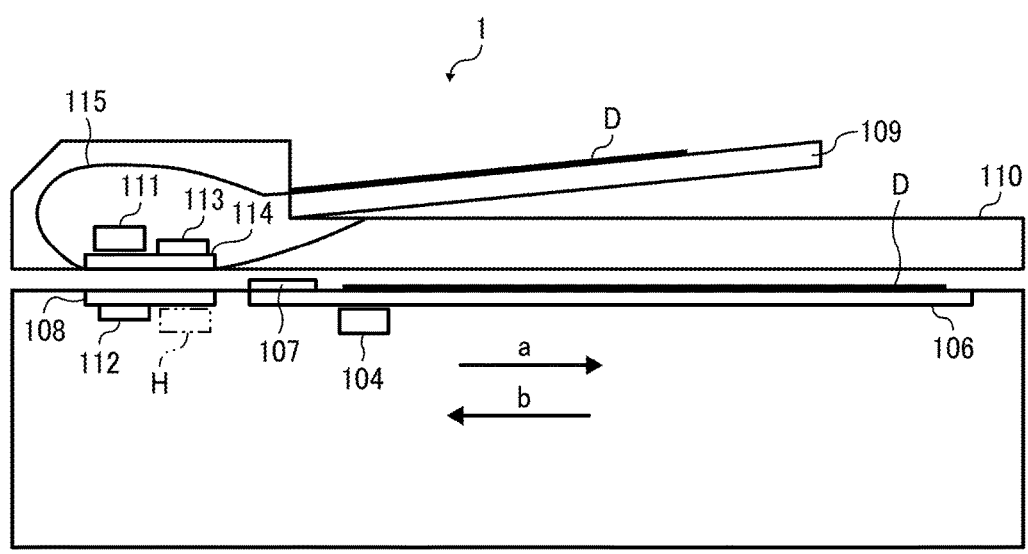
FIG. 2 is a longitudinal sectional view illustrating a schematic configuration of an image reading device according to an embodiment of this disclosure.
Figure 3A:
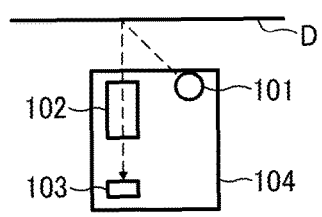
FIGS. 3A and 3B are diagrams illustrating respective configurations of reading modules in the image reading device according to the embodiment of this disclosure.
Figure 3B:
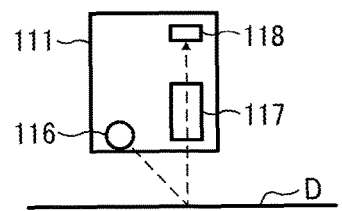
Figure 4:
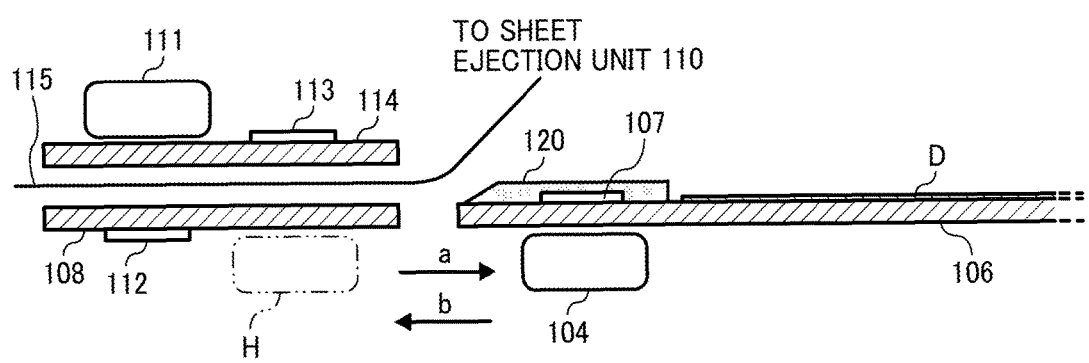
FIG. 4 is a diagram illustrating relative positions of the reading modules and reference white plates in the image reading device according to the embodiment of this disclosure.

FIG. 2 is a longitudinal sectional view illustrating a schematic configuration of an image reading device according to an embodiment of this disclosure. FIGS. 3A and 3B are diagrams illustrating respective configurations of reading modules of the image reading device in FIG. 2. FIG. 4 is a diagram illustrating relative positions of the reading modules and reference white plates of the image reading device in FIG. 2.

As illustrated in FIG. 2, an image reading device 1 according to an embodiment of this disclosure includes reading modules 104 and 111, a document table glass 106, reference white plates 107, 112, and 113, contact glasses 108 and 114, a document table 109, a document ejection unit 110, and a document transport path 115 extending from the document table 109 to the document ejection unit 110 through a space under the lower surface of the contact glass 114. In FIG. 2, D represents a document.

Herein, the reading module 104 serves as a first image reading unit, and the reading module 111 serves as a second image reading unit. Further, the reference white plate 107 serves as a first shading reference member, the reference white plate 113 serves as a second shading reference member, and the reference white plate 112 serves as a third shading reference member.

As illustrated in FIGS. 2 and 4, the reading module 104 is capable of reciprocating in a sub-scanning direction (i.e., the direction of arrow a or b) under the contact glass 108 and the document table glass 106. At a home position H of the reading module 104 indicated by a broken line, the reading module 104 faces the reference white plate 113 across the contact glass 108, the document transport path 115, and the contact glass 114. That is, the home position H is included in an area in which the reading module 104 faces the document transport path 115.

At the home position H, the reading module 104 is capable of reading the reference white plate 113 and one surface of the document D (i.e., the upper surface of the document D on the document table 109) transported on the document transport path 115.

Further, when located under the document table glass 106, the reading module 104 is capable of reading the lower surface of the reference white plate 107 and the lower surface of the document D on the document table glass 106. In the entire area under the document table glass 106, the reading module 104 does not face the document transport path 115.

As illustrated in FIG. 4, the reference white plate 107 is provided inside a guide member 120 for guiding the document D transported on the document transport path 115 to the document ejection unit 110, and the lower surface of the reference white plate 107, i.e., a read surface of the reference white plate 107 read by the reading module 104, is on a level with the upper surface of the document table glass 106. That is, the distance from the reading module 104 to the read surface of the reference white plate 107 is the same as the distance from the reading module 104 to the read surface of a document D on the document table glass 106. These distances are also the same as the distance from the reading module 104 at the home position H to the document transport path 115. Each of these distances will also be referred to as a first distance.

The reading module 111 is provided above the contact glass 114, and faces the reference white plate 112 across the contact glass 144, the document transport path 115, and the contact glass 108. The reading module 111 is capable of reading the reference white plate 112 and the other surface of the document D (i.e., the lower surface of the document D on the document table 109) transported on the document transport path 115. The distance from the reading module 111 to the upper surface of the reference white plate 112, i.e., the read surface of the reference white plate 112, is the same as the distance from the reading module 104 at the home position H to the lower surface of the reference white plate 113, i.e., the read surface of the reference white plate 113. Each of these distances will also be referred to as a second distance.

As illustrated in FIG. 3A, the reading module 104 includes a document illuminating light source 101, a lens 102, and a line image sensor 103. Further, as illustrated in FIG. 3B, the reading module 111 includes a document illuminating light source 116, a lens 117, and a line image sensor 118.

In the reading module 104, the document illuminating light source 101 includes light sources for red (R), green (G), and blue (B) colors (hereinafter referred to as the RGB colors), and irradiates the document D with light for each of the RGB colors through the document table glass 106 or the contact glass 108. The light emitted to the document D is reflected by the document D, and forms an image on the line image sensor 103 via the lens 102. The document illuminating light source 101, the lens 102, and the line image sensor 103 are disposed for each of pixels along main scanning lines. With this configuration, the document D is read for each of the main scanning lines. The line image sensor 103 is formed of a charge coupled device (CCD) or a complementary metal oxide semiconductor (CMOS), for example.

Similarly, in the reading module 111, the document illuminating light source 116 includes light sources for the RGB colors, and irradiates the document D with light for each of the RGB colors through the contact glass 114. The light emitted to the document D is reflected by the document D, and forms an image on the line image sensor 118 via the lens 117. The document illuminating light source 116, the lens 117, and the line image sensor 118 are disposed for each of pixels along main scanning lines. With this configuration, the document D is read for each of the main scanning lines. The line image sensor 118 is formed of a CCD or a CMOS, for example.

Figure 5:
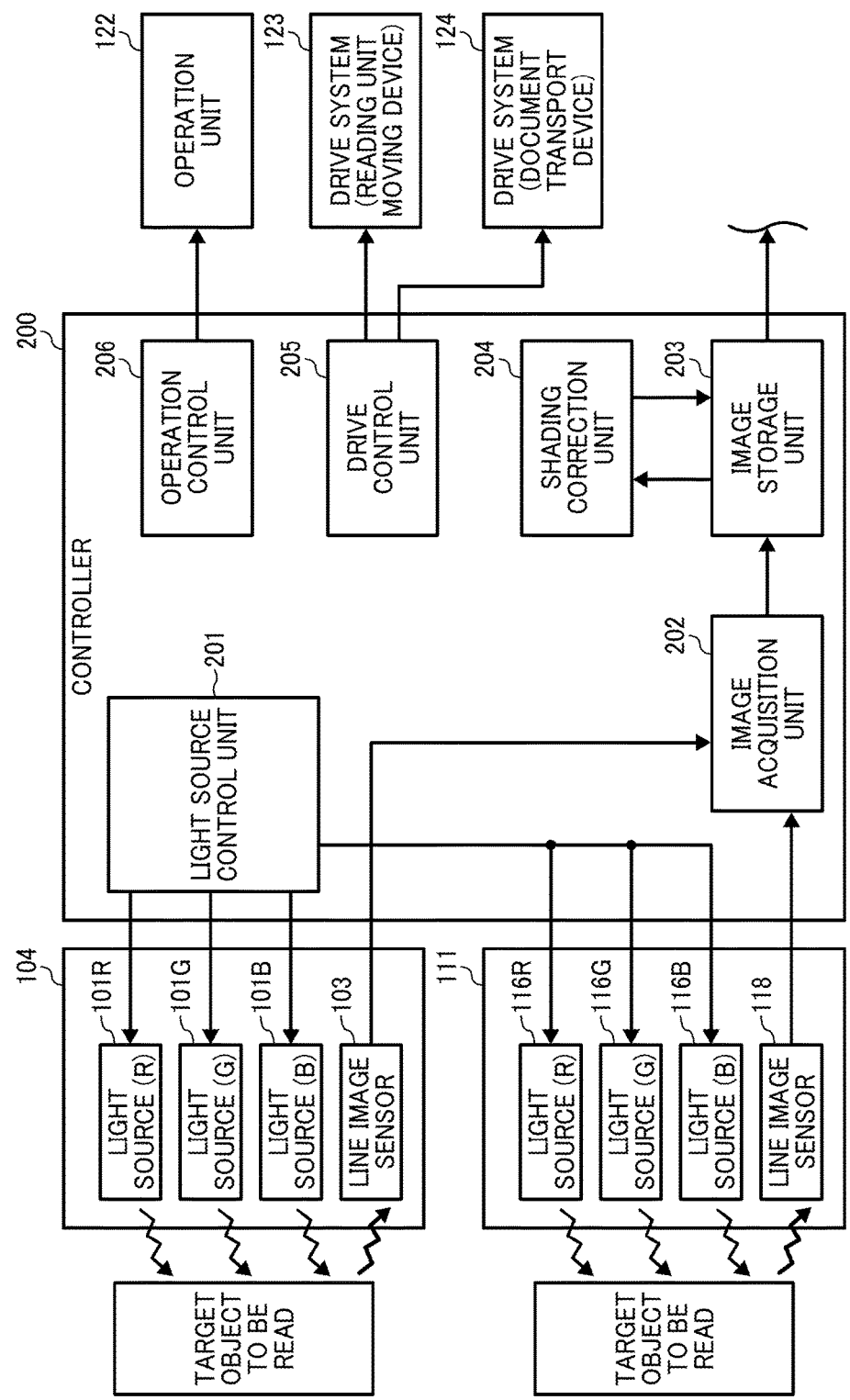
FIG. 5 is a block diagram illustrating a functional configuration of the image reading device according to the embodiment of this disclosure.

FIG. 5 is a block diagram illustrating a functional configuration of the image reading device 1 according to the embodiment of this disclosure. As illustrated in FIG. 5, the image reading device 1 according to the present embodiment includes a controller 200, the reading modules 104 and 111, an operation unit 122, a drive system 123 serving as a reading unit moving device, and a drive system 124 serving as a document transport device. The reading modules 104 and 111, the operation unit 122, and the drive systems 123 and 124 are connected to the controller 200.

The controller 200 includes a light source control unit 201, an image acquisition unit 202, an image storage unit 203, a shading correction unit 204, a drive control unit 205, and an operation control unit 206. The reading module 104 includes the line image sensor 103 and document illuminating light sources 101R, 101G, and 101B for the RGB colors included in the document illuminating light source 101 in FIG. 3A. The reading module 111 includes the line image sensor 118 and document illuminating light sources 116R, 116G, and 116B for the RGB colors included in the document illuminating light source 116 in FIG. 3B.

The light source control unit 201 is a lighting control unit capable of separately controlling the document illuminating light sources 101R, 101G, 101B, 116R, 116G, and 116B of the reading modules 104 and 111. The light emitted from the document illuminating light sources 101R, 101G, and 101B or 116R, 116G, and 116B for the RGB colors is reflected by the document D, i.e., the target object to be read, and is received by the line image sensor 103 or 118 shared by the RGB colors.

The image acquisition unit 202 acquires signals output by the line image sensors 103 and 118 as image signals. That is, the image acquisition unit 202 functions as a read signal acquisition unit that acquires read signals output by the line image sensors 103 and 118. The acquired read signals are aligned in an image format and stored in the image storage unit 203.

The shading correction unit 204 calculates a correction value based on shading data obtained by reading the reference white plates 107, 112, and 113, and corrects the difference in image output between the line image sensors 103 and 118 due to sensitivity variation between pixels and unevenness of the light sources.

The drive control unit 205 controls the drive systems 123 and 124. The drive system 123 moves the reading module 104 in the directions of arrows a and b illustrated in FIGS. 2 and 4, and the system 124 transports the document D on the document table 109 through the document transport path 115.

The operation control unit 206 controls the operation unit 122 used to operate the image reading device 1. The operation unit 122, which includes operation members such as a touch panel and hardware keys, outputs signals in accordance with operations performed on the operation members. The operation control unit 206 acquires the signals output by the operation unit 122, and the controller 200 controls the respective units of the image reading device 1 in accordance with the signals acquired by the operation control unit 206.

The controller 200 according to the present embodiment is configured with software and hardware operating in cooperation with each other. That is, the controller 200 according to the present embodiment is formed of hardware such as integrated circuits and a software control unit configured with an arithmetic device, such as a central processing unit (CPU), performing arithmetic operations in accordance with programs stored in a read-only memory (ROM) or a hard disk drive (HDD) or programs read into a random access memory (RAM). With this configuration, the image reading device 1 corrects an error in the shading data caused by the difference between the distance from the reading module 111 to the reference white plate 112 and the distance from the reading module 111 to the surface of the document D transported on the document transport path 115.

A basic image reading operation of the image reading device 1 will now be described.

There are two types of image reading operations: an operation of reading the document D placed on the document table glass 106 and an operation of reading the document D on the document table 109 while transporting the document D, which will hereinafter occasionally be referred to as scanner reading and document feeder reading, respectively.

The reading of the document D on the document table glass 106 will first be described.

If a command for reading the document D is input through, for example, pressing a hardware key provided in the operation unit 122, the image reading device 1 causes the drive system 123 to move the reading module 104 in the direction of arrow a from the home position H immediately under the contact glass 108. Thereby, the reading module 104 is disposed immediately under the reference white plate 107.

The reading module 104 is operated in this state to execute the reading operation as described above. Thereby, the reference white plate 107 is read, and the shading data is generated. That is, the output signals of the pixels of the line image of the reference white plate 107 read by the line image sensor 103 are generated as the shading data.

After the completion of the process of generating the shading data, the reading module 104 is driven by the drive system 123 to move in the direction of arrow b to the home position H. The drive system 123 then accelerates the reading module 104 in the direction of arrow a from the home position H, and the reading module 104 is driven to move at a constant speed until reaching a leading end portion (i.e., a left end portion in FIGS. 2 and 4) of the document D on the document table glass 106.

When the reading module 104 reaches the leading end portion of the document D, the line image sensor 103 starts the process of reading the image of the document D. The drive system 123 continues to move the reading module 104 in the direction of arrow a at the constant speed, and stops the movement of the reading module 104 when the reading module 104 reaches a trailing end of the document D. The drive system 123 then moves the reading module 104 in the direction of arrow b to return the reading module 104 to the home position H. Thereby, the current image reading process is completed, and the image reading device 1 stands by until the next image reading process.

In this image reading process, illuminance unevenness of the document illuminating light source 101, variation of the lens 102, and sensitivity variation between pixels of the line image sensor 103 are corrected with the shading data generated through the reading of the reference white plate 107, and thereby reading unevenness in the read image of the document D is corrected.

The reading of the document D during the transport thereof will now be described.

The control of the reading module 104 is similar to that in the above-described reading of the document D on the document table glass 106 until the process of generating the shading data.

After the completion of the process of generating the shading data, the reading module 104 is driven by the drive system 123 to move in the direction of arrow b to the home position H. Meanwhile, the reading module 111 reads the reference white plate 112 facing the reading module 111, and the shading correction unit 204 performs the process of generating the shading data.

Then, the drive system 124 transports the document D placed on the document table 109 to the document transport path 115 at a constant speed. When the leading end of the document D being transported reaches the contact glass 108, the reading modules 104 and 111 start reading the document D, as described above. When the reading reaches the trailing end of the document D, the reading modules 104 and 111 complete the reading operation. Thereby, the current image reading process is completed, and the image reading device 1 stands by until the next image reading process.

In this image reading process, the shading correction of the image read by the reading module 104 is performed based on the shading data generated through the reading of the reference white plate 107. Further, the shading correction of the image read by the reading module 111 is performed based on the shading data obtained by correcting the error of the shading data generated through the reading of the reference white plate 112, which is caused by the difference between the distance from the reading module 111 to the reference white plate 112 and the distance from the reading module 111 to the surface of the document D.

A description will now be made of a method performed by the image reading device 1 to correct the error of the shading data resulting from the difference between the distance from the reading module 111 to the reference white plate 112 and the distance from the reading module 111 to the surface of the document D.

Figure 6:
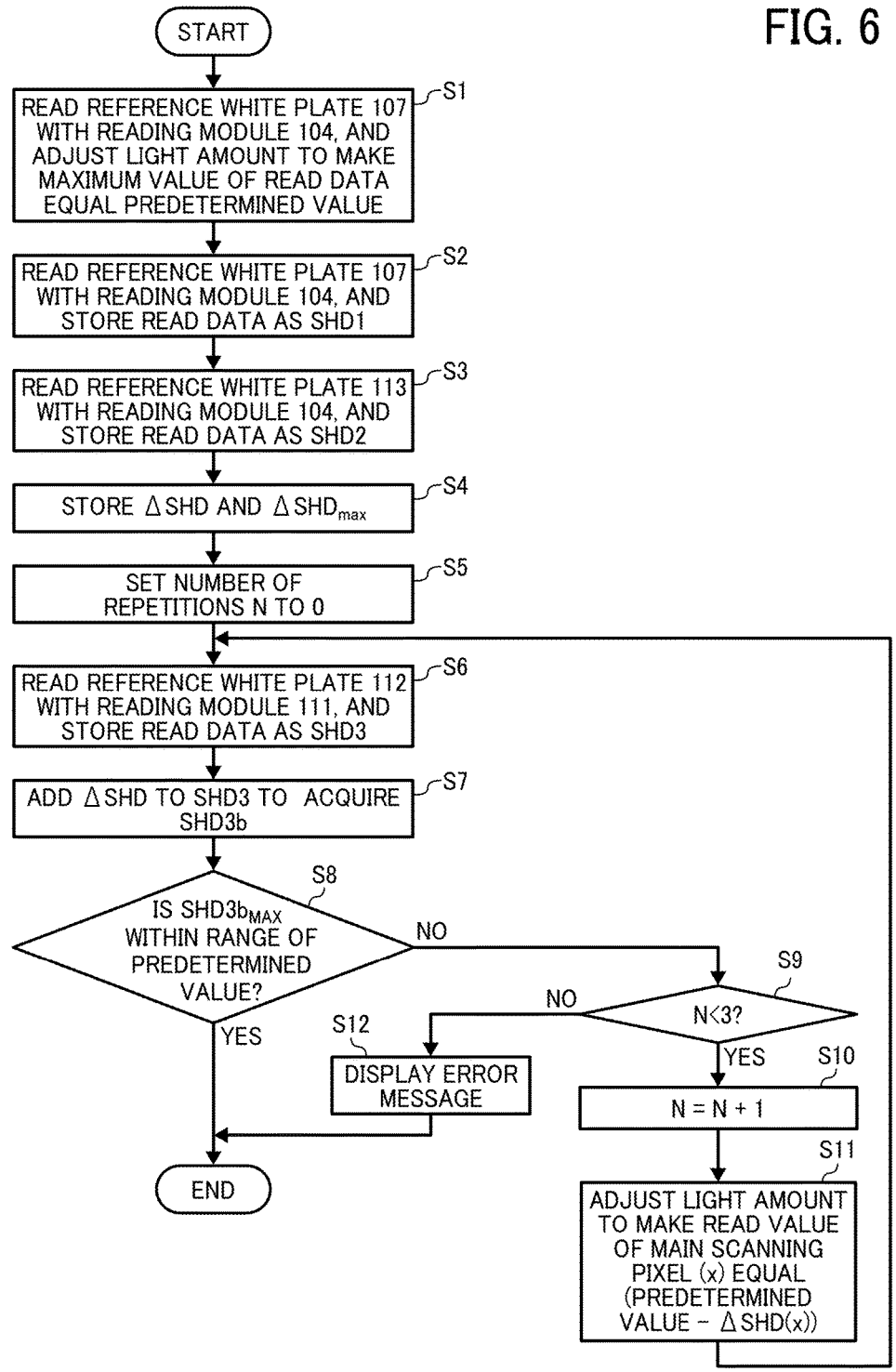
FIG. 6 is a flowchart illustrating a procedure of generating shading data performed by the image reading device according to the embodiment of this disclosure.

FIG. 6 is a flowchart illustrating a procedure of generating the shading data performed by the image reading device 1 according to the embodiment of this disclosure, i.e., the procedure of a method of correcting the above-described error of the shading data. FIGS. 7A to 7D are graphs illustrating examples of the shading data generated by the procedure illustrated in FIG. 6.

The reading module 104 first reads the reference white plate 107, and the light source control unit 201 adjusts the light amount of the document illuminating light source 101 such that the maximum value of the read value acquired by the image acquisition unit 202 equals a predetermined value (step S1). When the read value ranges from 0 digits to 255 digits, the predetermined value is preferably approximately 230 digits including a margin. Further, the reading by the reading module 104 is performed on a plurality of main scanning lines, and the read values at the same main scanning position in each of the main scanning lines are averaged to eliminate noise.

Figure 7A:
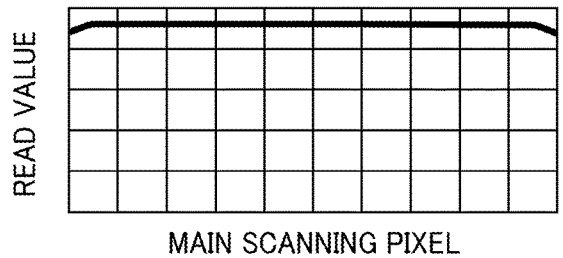
FIGS. 7A to 7D are graphs illustrating examples of the shading data generated by the image reading device according to the embodiment of this disclosure.

After the adjustment, the reading module 104 reads the reference white plate 107, and the image acquisition unit 202 stores the resulting read value in the image storage unit 203 as first shading data SHD1 (step S2). FIG. 7A illustrates an example of the first shading data SHD1.

Figure 7B:
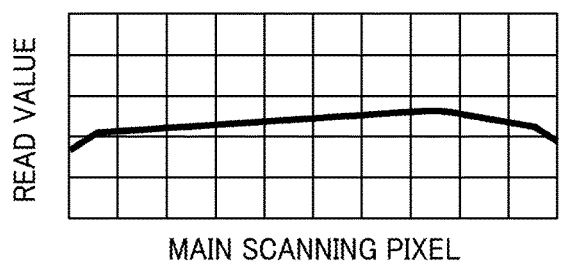

Then, the drive control unit 205 controls the drive system 123 to move the reading module 104 to the position immediately under the reference white plate 113, and the reading module 104 reads the reference white plate 113. The image acquisition unit 202 stores the resulting read value in the image storage unit 203 as second shading data SHD2 (step S3). FIG. 7B illustrates an example of the second shading data SHD2.

Then, the shading correction unit 204 calculates a difference ΔSHD between the first shading data SHD1 and the second shading data SHD2 and a maximum value $\Delta SHD_{max}$ of the difference ΔSHD, and stores the difference ΔSHD and the maximum value $\Delta SHD_{max}$ in the image storage unit 203 (step S4).

The shading correction unit 204 then sets the number of repetitions N to zero (step S5).

Figure 7C:
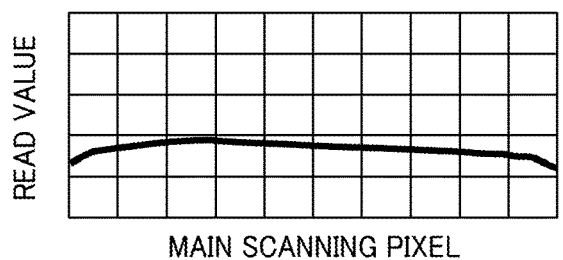

Then, the reading module 111 reads the reference white plate 112, and the image acquisition unit 202 stores the resulting read value in the image storage unit 203 as third shading data SHD3 (step S6). FIG. 7C illustrates an example of the third shading data SHD3. The second shading data SHD2 and the third shading data SHD3 are ideally the same, but may be different owing to, for example, the difference in characteristics between the two reading modules 104 and 111.

Figure 7D:
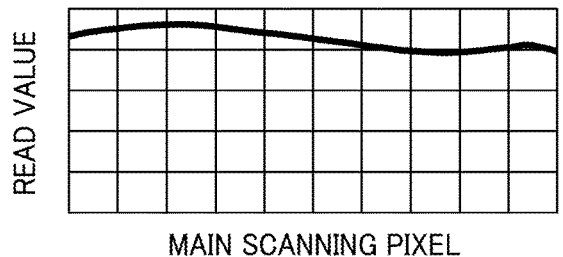

The shading correction unit 204 then adds the difference ΔSHD to the third shading data SHD3 to acquire corrected data SHD3b of the third shading data SHD3 (step S7). FIG. 7D illustrates an example of the corrected data SHD3b.

The first shading data SHD1, the second shading data SHD2, the difference ΔSHD, the third shading data SHD3, and the corrected data SHD3b respectively corresponding to FIGS. 7A, 7B, 7C, and 7D described above are illustrated in TABLE 1 given below.

TABLE 1

| Data | Main scanning pixel read value (digit) | | | | | | | | | |
|------|---|---|---|---|---|---|---|---|---|---|
|      | 1 | 2 | 3 | 4 | 5 | 6 | 7 | 8 | 9 | 10 |
| SHD1 | 230 | 230 | 230 | 230 | 230 | 230 | 230 | 230 | 230 | 230 |
| SHD2 | 100 | 104 | 108 | 112 | 116 | 120 | 124 | 126 | 123 | 120 |
| ΔSHD | 130 | 126 | 122 | 118 | 114 | 110 | 106 | 104 | 107 | 110 |
| SHD3 | 80 | 90 | 100 | 98 | 94 | 90 | 86 | 82 | 78 | 74 |
| SHD3b | 210 | 216 | 222 | 216 | 208 | 200 | 192 | 186 | 185 | 184 |

$\Delta SHD_{max} = 130$

Then, a maximum value $SHD3b_{max}$ of the corrected data SHD3b is compared with the predetermined value. If the maximum value $SHD3b_{max}$ is within a range of the predetermined value (e.g., from 95% of the predetermined value to 105% of the predetermined value) (YES at step S8), the process is completed. If the maximum value $SHD3b_{max}$ is outside the range of the predetermined value (NO at step S8), the number of repetitions N is checked (step S9). The number of repetitions N is set to three here, but may be any given number. If the number of repetitions N is less than three (YES at step S9), the number of repetitions N is added with 1 (step S10).

Then, the shading correction unit 204 adjusts the light amount of the document illuminating light source 116 such that the read value at a position x of a main scanning pixel at which the value of the third shading data SHD3 is maximized equals (predetermined value–ΔSHD(x)) (step S11), and returns to step S6.

Herein, the adjustment of the light amount at step S11 involves changes in the magnitude of the current value and the lighting time. Further, the third shading data SHD3 may be calculated as in the following calculation formula 1:

$$SHD3(n) \leftarrow SHD3(n) \times (\text{predetermined value} - SHD3(x))/(SHD3b(x) - SHD3(x)) \quad (1)$$

Herein, n represents the number of main scanning pixels.

If the number of repetitions N is three or greater (NO at step S9), an error message is displayed (step S12), and the process is completed.

The process illustrated in FIG. 6 is thus executed to adjust the light amount of the document illuminating light source 116 of the reading module 111 (step S11) to set the maximum value $SHD3b_{max}$ within the range of the predetermined value (YES at step S8). Thereby, the maximum value $SHD3b_{max}$ is adjusted to the maximum value of the first shading data SHD1. Consequently, the correct shading data is obtained in which the error of the shading data caused by the difference between the distance from the reading module 111 to the reference white plate 112 and the distance from the reading module 111 to the surface of the document D is corrected.

Between steps S4 and S5, another step may be performed at which the reading module 111 reads the reference white plate 112 and the light source control unit 201 adjusts the light amount of the document illuminating light source 116 such that the maximum value of the read value acquired by the image acquisition unit 202 equals (predetermined value–$\Delta SHD_{max}$). This additional step prevents saturation of the corrected data SHD3b.

The use of the read data of the reading module 104 for the other reading module 111 may cause misalignment in the main scanning direction. Such misalignment, however, is correctable by detecting a change in the main scanning pixels and a misalignment amount or by making positional adjustment with a set value of registration in the main scanning direction.

Figure 8:
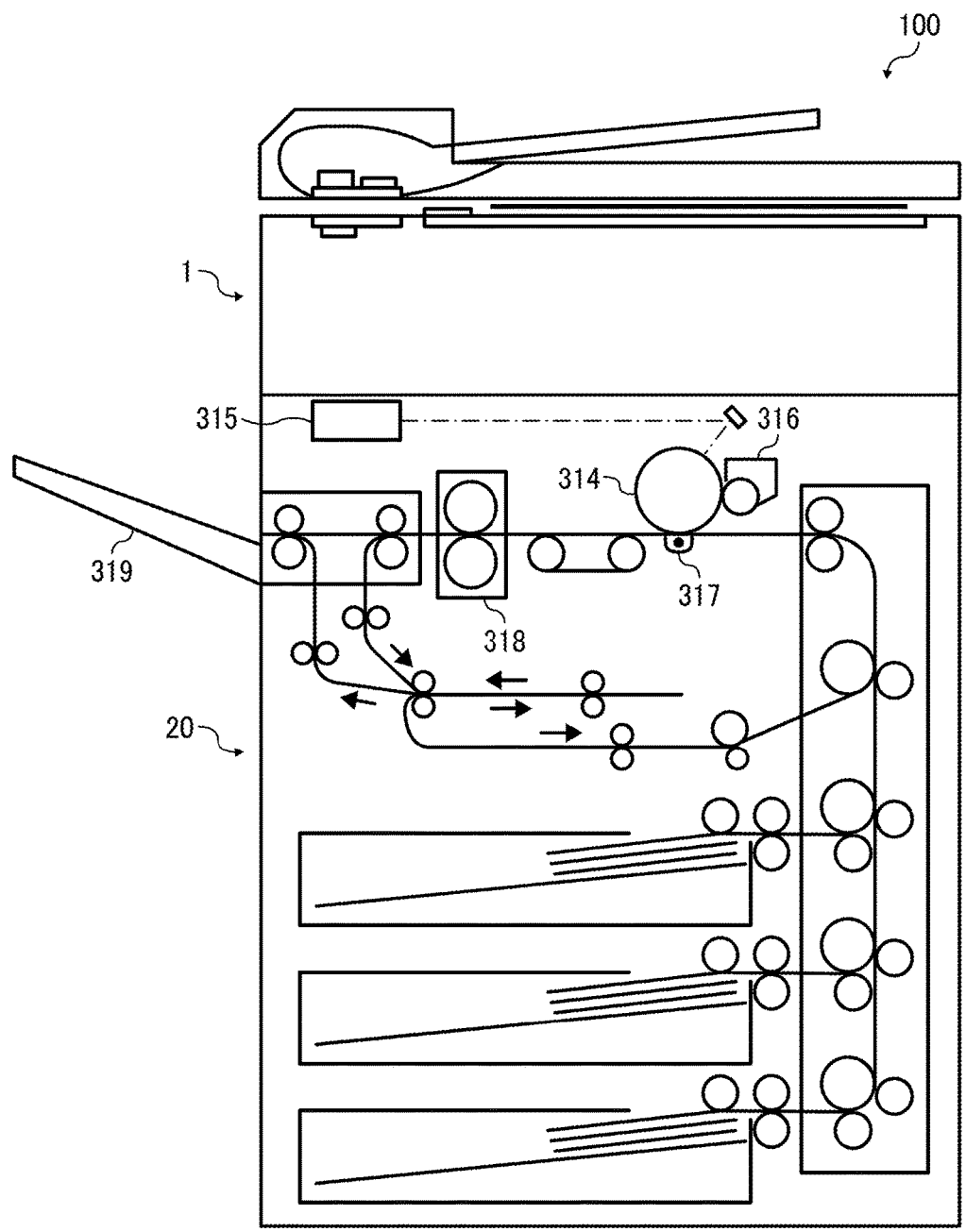
FIG. 8 is a longitudinal sectional view illustrating a schematic configuration of an image forming apparatus according to an embodiment of this disclosure.

FIG. 8 is a longitudinal sectional view illustrating a schematic configuration of an image forming apparatus 100 according to an embodiment of this disclosure. The image forming apparatus 100 includes the image reading device 1 and an image printing unit 20. The configuration of the image reading device 1 has been described above, and thus description of the internal configuration of the image reading device 1 will be omitted.

The image printing unit 20 includes a photoconductor 314, a laser unit 315, a developing device 316, a transfer device 317, a fixing device 318, and a sheet ejection tray 319. A surface of the photoconductor 314 is uniformly charged by a charger and subjected to writing by the laser unit 315 based on image data generated by the image reading device 1. Thereby, an electrostatic latent image is formed on the photoconductor 314. The electrostatic latent image is then developed into a visible image with toner supplied from the developing device 316, and the visualized toner image is transferred onto a sheet (i.e., recording medium) by the transfer device 317. The transferred toner image is then fixed on the sheet by the fixing device 318, and the sheet is ejected to the sheet ejection tray 319.

As described above in detail, the image reading device 1 according to the embodiment of this disclosure is capable of generating the correct shading data of the surface of the document D without feeding a reference sheet in the configuration in which the distance from the reading module 111 to the reference white plate 112 is different from the distance from the reading module 111 to the surface of the document D.

Since there is no need to feed the reference sheet, manual work by a production worker, a user, or a maintenance engineer, for example, is reduced.

Further, as illustrated in FIG. 6, the image reading device 1 according to the embodiment of this disclosure standardizes the shading data, i.e., equalizes the maximum value of the first shading data SHD1 to the maximum value of the corrected data SHD3b, thereby making the resolution (i.e., maximum digit number) of the read image obtained through scanner reading the same as the resolution of the read image obtained through document feeder reading.

Further, the image reading device 1 according to the embodiment of this disclosure adjusts the light amount of the document illuminating light source 116 of the reading module 111 to adjust the maximum value of the corrected data SHD3b to the maximum value of the first shading data SHD1, thereby allowing the read image obtained through scanner reading and the read image obtained through document feeder reading to have the same quality.

Further, the image reading device 1 according to the embodiment of this disclosure performs a predetermined arithmetic operation on the third shading data SHD3 to adjust the maximum value of the corrected data SHD3b to the maximum value of the first shading data SHD1, thereby accurately equalizing the read data obtained through scanner reading to the read image obtained through document feeder reading.

Numerous additional modifications and variations are possible in light of the above teachings. For example, elements or features of different illustrative and embodiments herein may be combined with or substituted for each other within the scope of this disclosure and the appended claims. Further, features of components of the embodiments, such as number, position, and shape, are not limited to those of the disclosed embodiments and thus may be set as preferred. Further, the above-described steps are not limited to the order disclosed herein. It is therefore to be understood that, within the scope of the appended claims, this disclosure may be practiced otherwise than as specifically described herein.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

What is claimed is:

1. An image reading device comprising:
    a first image reading unit movable between a first area facing a document transport path and a second area not facing the document transport path, and configured to read, in the first area, a first surface of a document transported on the document transport path;
    a second image reading unit disposed in the first area and configured to read a second surface of the document;
    a first shading reference member facing the first image reading unit at a first distance therefrom when the first image reading unit is located at a second position in the second area, wherein the first image reading unit is configured to read the first shading reference member to acquire first shading data;
    a second shading reference member facing the first image reading unit at a second distance therefrom across the document transport path when the first image reading unit is located at a first position in the first area, wherein the first image reading unit is configured to read the second shading reference member to acquire second shading data;
    a third shading reference member facing the second image reading unit at the second distance therefrom across the document transport path, wherein the second image reading unit is configured to read the third shading reference member to acquire third shading data; and
    a controller comprising a memory storing computer-readable instructions and a processor configured to execute the computer-readable instructions to correct an error in the third shading data, resulting from a distance from the second image reading unit to the third shading reference member being different from a distance from the second image reading unit to the document transported on the document transport path, by,
        determining a difference between the first shading data and the second shading data,
        correcting the third shading data based on the difference between the first shading data and the second shading data to acquire corrected third shading data,
        comparing a maximum value of the corrected third shading data with a threshold value, and
        adjusting, in response to the maximum value of the corrected third shading data being outside a tolerance range of the threshold value, a light amount of a light source of the second image reading unit to set the maximum value of the corrected third shading data within the tolerance range of the threshold value, whereby the maximum value of the corrected third shading data is adjusted to a maximum value of the first shading data.

2. The image reading device of claim 1, wherein the first distance corresponds to a distance from the first image reading unit located at the first position in the first area to a part of the document transport path facing the first image reading unit.

3. The image reading device of claim 1, further comprising a document table on which a document is placed to be read by the first image reading unit moving in the second area.

4. The image reading device of claim 1, wherein the processor of the controller is further configured to execute the computer-readable instructions to standardize the corrected third shading data based on a calculation performed on the third shading data to adjust the maximum value of the corrected third shading data to the maximum value of the first shading data.

5. The image reading device of claim 1, wherein the processor of the controller is further configured to execute the computer-readable instructions to correct misalignment between main scanning pixels of data read by the first image reading unit and main scanning pixels of data read by the second image reading unit.

6. The image reading device of claim 1, wherein:
    the first image reading unit is configured to read the first shading reference member to acquire a read value; and
    the processor of the controller is further to configured to execute the computer-readable instructions to adjust a light amount of a light source of the first image reading unit such that a maximum value of the read value acquired equals the threshold value, prior to acquiring the first shading data.

7. The image reading device of claim 1, wherein:
    the second image reading unit is configured to read the third shading reference member to acquire a read value; and
    the processor of the controller is further to configured to execute the computer-readable instructions to adjust a light amount of a light source of the second image reading unit such that a maximum value of the read value acquired equals a difference between (i) the threshold value and (ii) a maximum value of the difference between the first shading data and the second shading data, prior to acquiring the third shading data.

8. The image reading device of claim 1, wherein the processor of the controller is configured to execute the computer-readable instructions to adjust the light amount of the light source of the second image reading unit such that a read value at a position x of a main scanning pixel at which a value of the third shading data is maximized equals a difference between (i) the threshold value and (ii) the difference between the first shading data and the second shading data at the position x.

9. An image forming apparatus comprising the image reading device of claim 1.

10. A shading data processing method performed by an image reading device including a first image reading unit and a second image reading unit, the first image reading unit being movable between a first area facing a document transport path and a second area not facing the document transport path, and configured to read, in the first area, a first surface of a document transported on the document transport path, the second image reading unit being disposed in the first area and configured to read a second surface of the document, the shading data processing method comprising:

acquiring first shading data through reading, with the first image reading unit and at a second position in the second area, a first shading reference member facing the first image reading unit as at a first distance therefrom;

acquiring second shading data through reading, with the first image reading unit and at a first position in the first area, a second shading reference member facing the first image reading unit at a second distance therefrom across the document transport path;

acquiring third shading data through reading, with the second image reading unit, a third shading reference member facing the second image reading unit at the second distance therefrom across the document transport path; and correcting an error in the third shading data, resulting from a distance from the second image reading unit to the third shading reference member being different from a distance from the second image reading unit to the document transported on the document transport path, by, determining a difference between the first shading data and the second shading data, correcting the third shading data based on the difference between the first shading data and the second shading data to acquire corrected third shading data, comparing a maximum value of the corrected third shading data with a threshold value, and adjusting, in response to the maximum value of the corrected third shading data being outside a tolerance range of the threshold value, a light amount of a light source of the second image reading unit to set the maximum value of the corrected third shading data within the tolerance range of the threshold value, whereby the maximum value of the corrected third shading data is adjusted to a maximum value of the first shading data.

\* \* \* \* \*